United States Patent [19]

Jamail

[11] Patent Number: 5,467,327
[45] Date of Patent: Nov. 14, 1995

[54] METHOD OF MASKING DATA ON A STORAGE MEDIUM

[76] Inventor: Randall Jamail, Houston, Tex.

[21] Appl. No.: 343,637

[22] Filed: Nov. 22, 1994

Related U.S. Application Data

[63] Continuation-in-part of Ser. No. 301,040, Sep. 6, 1994, which is a continuation of Ser. No. 172,849, Dec. 22, 1993, abandoned.

[51] Int. Cl.$^6$ ............................................. G11B 17/22
[52] U.S. Cl. ........................... 369/32; 369/47; 369/33
[58] Field of Search ........................... 369/32, 13, 124, 369/54, 56, 58, 47–48, 44.39, 44.26, 30, 33, 284, 275.2, 274.3, 286, 288, 100; 360/71, 49, 72.1, 72.2, 78.4

[56] References Cited

U.S. PATENT DOCUMENTS

| Re. 34,475 | 12/1993 | Custers et al. | 369/32 |
|---|---|---|---|
| 4,363,116 | 12/1982 | Kleuters et al. | 369/30 |
| 4,420,828 | 12/1983 | Yoshida et al. | 369/47 |
| 4,719,611 | 1/1988 | Miura et al. | 369/47 |
| 4,719,615 | 1/1988 | Feyrer et al. | 369/284 |
| 5,001,689 | 3/1991 | Bass et al. | 369/33 |
| 5,031,172 | 7/1991 | Umeda et al. | 369/275 |
| 5,036,511 | 7/1991 | Goldberg et al. | 369/284 |
| 5,059,473 | 10/1991 | Takahushi et al. | 428/162 |
| 5,080,946 | 1/1992 | Takagisi et al. | 428/64 |
| 5,117,416 | 5/1992 | Miyadera et al. | 369/284 |
| 5,157,646 | 10/1992 | Amemiya et al. | 369/47 |
| 5,200,948 | 4/1993 | Goldberg et al. | 369/284 |
| 5,255,260 | 10/1993 | Yamada et al. | 369/199 |
| 5,274,617 | 12/1993 | Terashima et al. | 369/54 |
| 5,293,568 | 3/1994 | Oshibe et al. | 369/32 |

OTHER PUBLICATIONS 1-22-94; Billboard Newspaper, p. 20, Popular Uprising, Coverage of New and Developing Prospects For The Heatseekers Chart, "Initiated" Article, Geoff Mayfield and Brett Atwood.

*Primary Examiner*—Ali Neyzari
*Attorney, Agent, or Firm*—Alton W. Payne

[57] ABSTRACT

A method of masking data on a storage medium for selective playback upon demand or for transcription to another medium. The method comprising the steps of (a) determining the position of the start location on the storage medium, (b) determining the position of the stop location on the storage medium, (c) positioning at least one data track on the storage medium between the start location and the stop location such that the data track has, adjacent thereto, enough space or time for accepting a concealed data track, and (d) impressing data on the storage medium for generating the concealed track having a hidden recording area such that the hidden recording area contains concealed data which can be accessed upon demand for transcription to another medium or for playback. The present invention can be adapted for use with different storage media such as, for example, a compact disk, a read-only memory compact disk, a mini-disk, a photo compact disk or the like. More particularly, the step of impressing data on the storage medium for generating the concealed track further comprises the step of generating the concealed track by identifying a position within the gap relative to either location or time for working with a player or transcriber and impressing the concealed track on the storage medium at the identified position.

9 Claims, 8 Drawing Sheets

| TRACK | INDEX | DESCRIPTION |
|-------|-------|-------------|
| 0 | 0 | Begin play point |
| 1 | 1 | Start Track 1 |
| 1 | 0 | Stop Track 2 |
| 2 | 1 | Start Track 1 |
| 2 | 0 | Stop Track 2 |
| ... | ... | ... |
| X | 0 | Stop Track X |

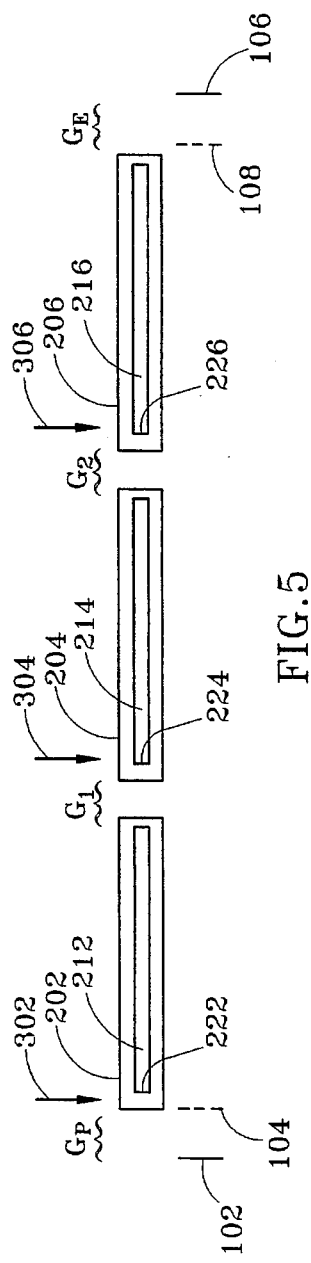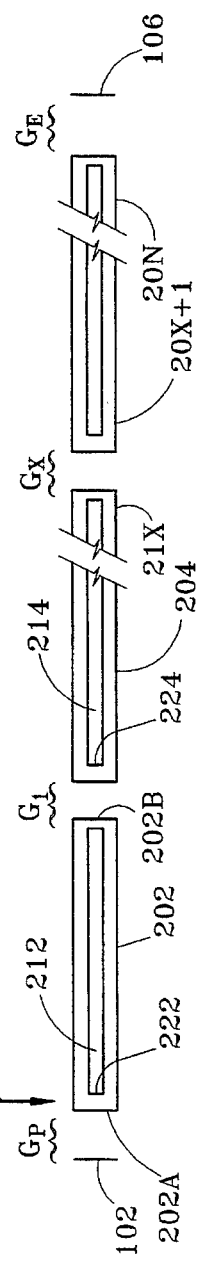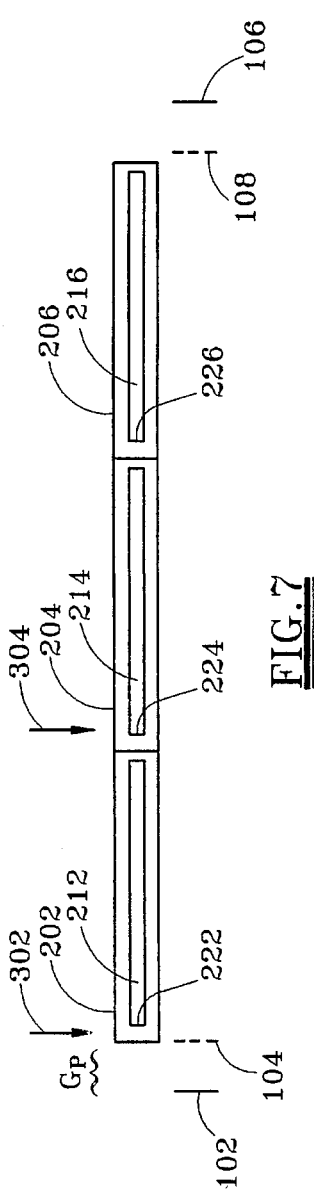

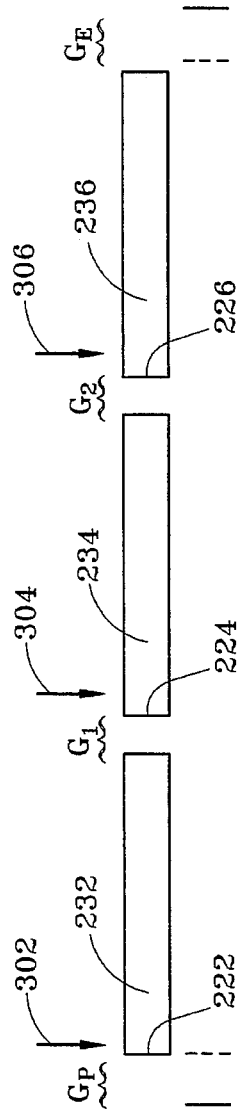
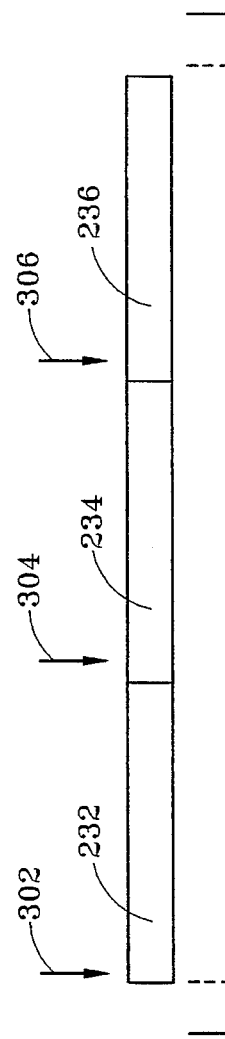
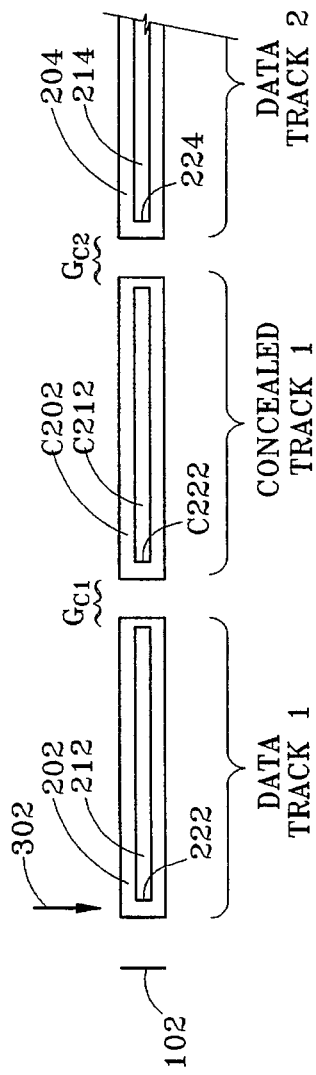
FIG.8
FIG.9
FIG.10

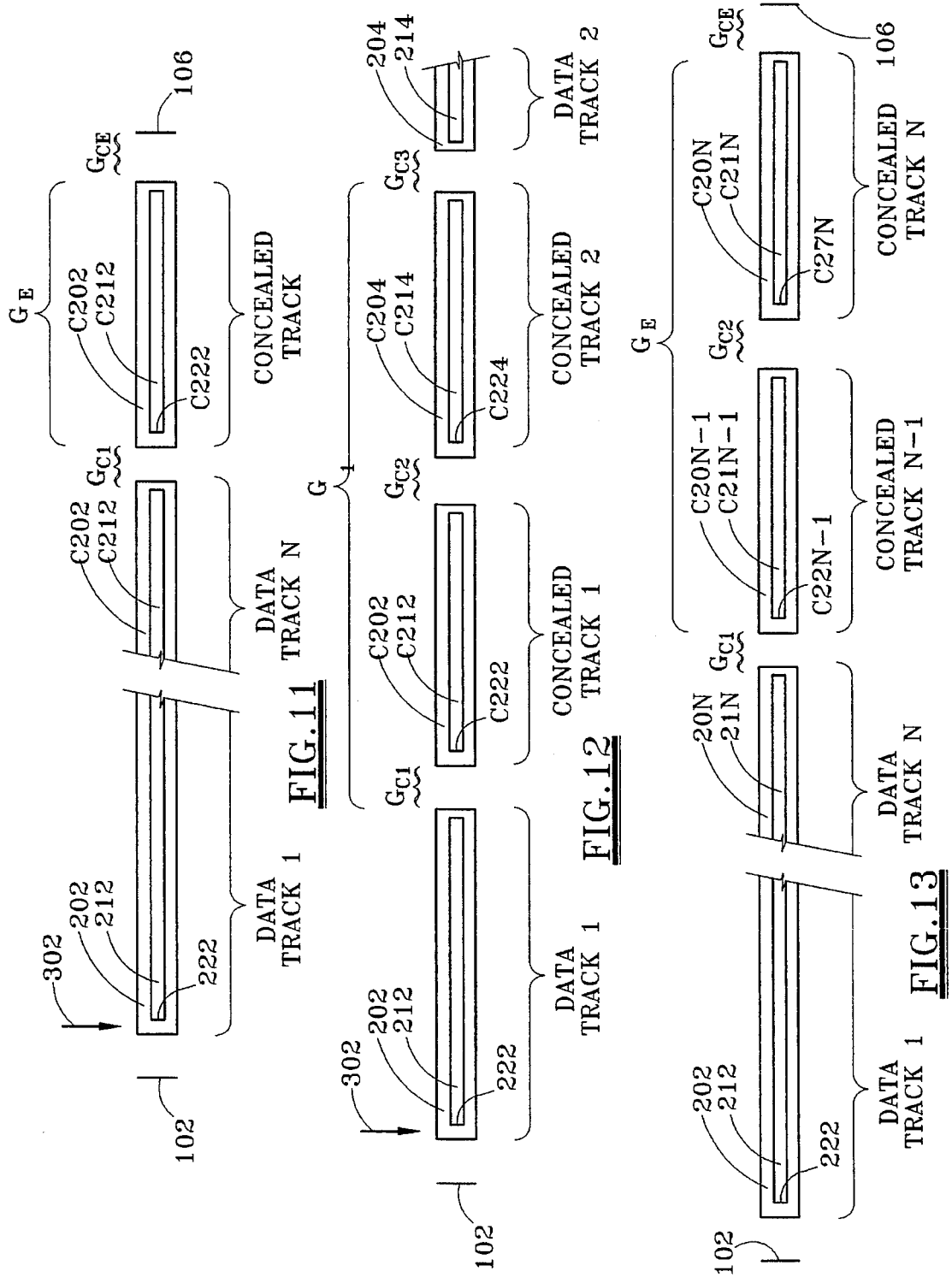

METHOD OF MASKING DATA ON A STORAGE MEDIUM

CROSS REFERENCE TO RELATED APPLICATION

The present application is a continuation-in-part application of the application of Randall Jamail and David Thompson, bearing U.S. Ser. No. 08/301,040, filed Sep. 6, 1994, entitled "Method of Selectively Concealing Magneto-Optical Compact Disk Data For Playback Upon Demand," now pending, which was a continuation of the application of equal inventors bearing U.S. Ser. No. 08/172,849, filed Dec. 22, 1993, entitled "Method of Prerecording Data for Playback Upon Demand" now abandoned.

FIELD OF THE INVENTION

The present invention relates to a method of masking data in a storage medium for selective playback upon demand or for transcription to another medium. Specifically, the present invention relates to adapting a storage medium for recording information on such medium in gaps adjacent to the data tracks or at the end of the data tracks.

BACKGROUND OF THE INVENTION

Data storage media are well known. Particularly, optical data storage media in the form of compact disks are well known. Compact disks are an alternative to long-playing records and magnetic tape cassettes. The disks with which consumers are familiar are optical read-only disks and the common disk player is designed specifically for this type of disk. These disks have a reflective surface containing pits which represent data in binary form. A description of these pits and how they function is provided by Watkinson, "The Art of Digital Audio," Focal Press, Chapter 13.

Compact disks are currently produced by a pressing process similar to the process used to produce conventional long playing records. The process is referred to herein as the "mastering" process. The mastering process starts by first polishing a plain glass optical disk. The disk has an outside diameter from 200 to 240 mm, a thickness of 6 mm and undergoes various cleaning and washing steps. The disk is then coated with a thin chrome film or coupling agent, a step taken to produce adhesion between the glass disk and a layer of photoresist, which is a photo-sensitive material. Data on a compact disk master tape are then transferred to the glass disk by a laser beam cutting method.

The glass disk is still completely flat after it is written on by the laser beam because pits are not formed until the glass is photographically developed. The disk surface is first made electrically conductive and then subjected to a nickel evaporation process. The disk, typically known as the glass master, then undergoes nickel electrocasting, a process which is similar to that used in making analog phonograph records. A series of metal replications follow, resulting in a disk called a stamper. The stamper is equivalent to a photographic negative in the sense that it is a reverse of the final compact disk; that is, there are now bumps where there were pits. This stamper is then used to make a pressing on a transparent polymer such as polyvinyl chloride, poly(ethyl-metacrylate) or a polycarbonate. The stamped surface is then plated with a reflective film such as aluminum or another metal, and finally a plastic coating is applied over the film to form a rigid structure.

The player operates by focusing a laser beam on the reflective metal through the substrate and then detecting reflected light. The optical properties of the substrate, such as its thickness and index of refraction, are thus critical to the player's detection systems and standard players are designed specifically with these parameters in mind.

The pits increase the optical path of the laser beam by an amount equivalent to a half wavelength, thereby producing destructive interference when combined with other (non-shifted) reflected beams. The presence of data thus takes the form of a drop in intensity of the reflected light. The detection system on a standard player is thus designed to require greater than 70% reflection when no destructive interference occurs and a modulation amplitude greater than 30% when data is present. These intensity limits, combined with the focusing parameters, set the criteria for the compact disks and other optical data storage media which can be read or played on such players. Media on which data can be recorded directly on and read directly from have a different configuration and operate under a somewhat different principle. One example is described in U.S. Pat. No. 4,719,615 (Feyrer et al.).

As optical information recording media of this type, compact disks (herein referred to simply as "CD") have been practically developed and widely used as optical information recording media of ROM (read only memory) type wherein pits are already formed on a light transmitting substrate by means of, for example, a press and a reflective layer of a metal is formed on the surface having such pits. As a further progress from such a ROM type, optical information recording media have been proposed on which information can be recorded by irradiating a laser beam to the substrate as the user requires. For Example, Japanese Unexamined Patent Publication No. 89605/1979 discloses an optical information recording medium which comprises at least a transparent substrate, a light absorptive layer containing a coloring matter formed on the substrate and a light reflective layer formed on the light absorptive layer, and on which information can optically be recorded and from which the recorded information can be reproduced.

To conduct the reproduction by commercially available CD players, optical recording media must be able to produce read-out signals which satisfy the CD standards which are accepted world wide. To satisfy the CD standards, typical requirements are that the reflectance is at least 70%; the block error rate is at most $3.0 \times 10^{-2}$; and when a push-pull method is employed for tracking pits, the push-pull valve is from 0.04 to 0.07.

However, none of the conventional recording media comprising a substrate having a pregroove, a light absorptive layer containing a coloring matter formed on the substrate and a light reflective layer formed on this absorptive layer, uses all the aspects of the CD format satisfying the various conditions prescribed by the CD standards.

It is, therefore, a feature of the present invention to provide a method of recording data for masking or concealing the data for later playback upon demand.

A feature of the present invention is to provide a method of masking data on a storage medium for selective playback upon demand or for transcription to another medium is provided.

Another feature of the present invention is to provide a method of masking data on a storage medium for positioning at least one data track on the storage medium such that the data track has, adjacent thereto, enough space or time for accepting a concealed data track.

Yet another feature of the present invention is to provide a method of masking data on a storage medium for positioning a last data track on the storage medium such that the data track has adjacent thereto, and after the last data track, enough space or time for accepting a concealed data track.

Yet another feature of the present invention is to provide a method of masking data on a storage medium for impressing data on the storage medium for generating a concealed track.

Still another feature of the present invention is to provide a method of masking data on a storage medium for impressing data on the storage medium for generating a hidden recording area such that the hidden recording area contains concealed data which can be accessed upon demand for transcription to another medium or for playback.

Yet still another feature of the present invention is to provide a method of masking data on a storage medium such as, for example, a compact disk, a read-only memory compact disk, a mini-disk, a photo compact disk or the like for impressing data on the storage medium for generating a concealed track which can be accessed upon demand for transcription to another medium or for playback.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, a method of masking data on a storage medium for selective playback upon demand or for transcription to another medium is provided.

The method of masking data on a storage medium is typically used with a storage medium adapted for communication with a player or transcriber such that the storage medium has a start location and a stop location with at least one data track therebetween. Each data track can include a data recording area for recording or reproducing the data. Also each track can include a start position indicative of a beginning location for the data recording area for that particular track. Typically, the start location precedes the first start position for the first track for either a location or a time of operation. The stop location follows the last data recording area for the last track to be located with respect to position on the medium or time of operation associated with the medium. Typically, the storage medium has a begin communication location at or in close proximity to the start position indicating the beginning of the data recording area for the respective track. The first start position is indicative of the beginning of the data recording area for the first track and the start position for each subsequent track, if any, is indicative of the beginning of the data recording area for the respective track. The storage medium is engaged at the begin communication location for either recording or reproducing data for each respective data track.

The method of the present invention comprising the steps of (a) determining the position of the start location on the storage medium, (b) determining the position of the stop location on the storage medium, (c) positioning at least one data track on the storage medium between the start location and the stop location such that the data track has, adjacent thereto, enough space or time for accepting a concealed data track, and (d) impressing data on the storage medium for generating the concealed track having a hidden recording area such that the hidden recording area contains concealed data which can be accessed upon demand for transcription to another medium or for playback.

The present invention can be adapted for use with different storage media such as, for example, a compact disk, a read-only memory compact disk, a mini-disk, a photo compact disk or the like.

Particularly, the step of impressing data on the storage medium for generating the concealed track further comprises the step of generating the concealed track by identifying a position within the gap relative to either location or time for working with a player or transcriber and impressing the concealed track on the storage medium at the identified position. The step of impressing the concealed track on the storage medium at the identified position includes impressing a recording area within the concealed track, and impressing a start position within the concealed track for indicating the location where the recording area begins for the concealed track. The step of identifying a position within the gap comprises the step of identifying a position with respect to the begin communication location or with respect to the start location or alternately with respect to the start position.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

FIG. 5 is a schematic illustration of a representative configuration embodying a track layout adaptable for use with the present invention.

FIG. 6 is a generic illustration of the representative configuration as illustrated in FIG. 5.

FIG. 7 illustrates a representative configuration of a track layout adaptable for use with the present invention.

FIG. 8 illustrates an embodiment of a representative configuration wherein the track and recording areas are identical areas.

FIG. 9 illustrates another representative configuration of another track layout adaptable for use with the present invention.

FIG. 10 is a schematic illustrating more particularly a concealed track disposed within a gap as practiced by the present invention.

FIG. 11 illustrates yet another embodiment of the present invention with the concealed track at the end of the data medium.

FIG. 12 illustrates yet another embodiment of the present invention wherein two concealed tracks are placed between two data tracks.

FIG. 13 illustrates yet another embodiment of the present invention wherein a plurality of concealed tracks are located at the end of a storage medium.

Figures 1, 3:
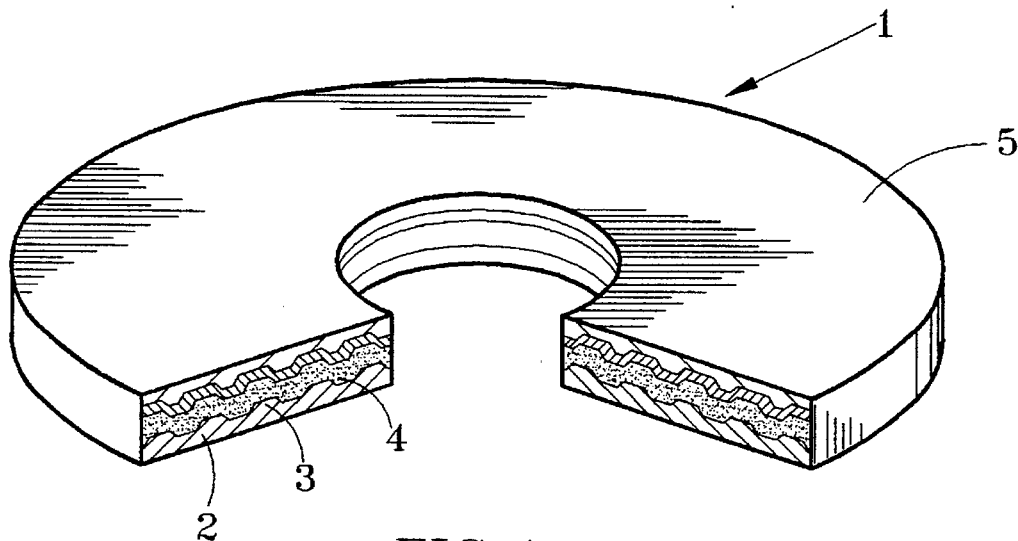
FIG. 1 is a partial cross section perspective view of a conventional compact disk (Prior Art).
FIG. 3 is a flow diagram illustrating the sequence of track counts on a conventional CD (Prior Art).

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

The presently preferred application of the present invention is for use with standard audio compact discs as found in, for example, music and record stores. However, the present invention can be adapted for use in other related storage media such as, for example, CD-ROM discs, mini-compact discs, single-session or multi-session Photo CDs, as well as 80-mm-diameter CD discs. A wide selection of CD storage media is available for entertainment, education, and business. A typical disc can hold over 650 megabytes (MB) of information—the equivalent of 270,000 pages of text, up to eight hours of speech and music (depending on the sound quality), hundreds of high-resolution images, or any combination of text, sound and graphics.

Standard music CDs provide sound and music recorded in a format typically referred to as digital audio. The present invention is especially adaptable for use in the digital audio format. Prior formats for storage media are silent with respect to concealing tracks or data between or adjacent to accessible tracks or data available for use.

Developers and industry producers have implemented numerous and varied standards or protocols. Of particular relevance are the CD standards co-developed by Philips and Sony for the digital audio format. The Phillips/Sony digital audio format is called "CD Digital Audio." The Philips/Sony CD Digital Audio technology is available for license from Philips in what is called the "Red Book." The Red Book standards have become the industry standards in the digital audio industry. The present invention provides a significant advancement to all known industry standards for digital audio technology, including the Red Book standards.

Further, the present invention has application to other known standards or protocols. Standards of relevance and possible application to the present invention are the Philips/Sony CD-ROM standards, known as the Yellow Book; the Philips/Sony CD-I standards, known the Green Book; the Philips/Sony Recordable CD standards, known as the Orange Book; the Philips/Sony CD-Video/Laser Disc standards; the Philips/Sony CD-ROM XA standards; the Philips/Sony CD-I Ready standards; the Philips/Sony CD-I Bridge standards; the Philips/Kodak Photo CD standard; and the Philips/JVC Video CD specification standard, known as the White Book.

It is known in the industry to use a pre-gap on the compact disk. The pre-gap is a buffer between a start communication location on the CD and a first start mark indicative of a beginning location for the data recording area for the first track on the CD. The start communication location on the CD is typically closer than the perimeter of the CD so that the CD is transcribed in an outward expanding radial direction. The pre-gap is provided, indeed required, on CD's to assure that the player can align itself with the start mark. Typically, the pre-gap is two (2) seconds on a CD. The pre-gap can be termed a buffer.

The CD player provides an indexing mechanism. The indexing mechanism reads from the CD a table of contents. The table of contents associated with the CD determines, for example, the start and finish location, and respective times for the different tracks or groupings of data on the CD. The CD table of contents information is read by the player and stored in memory. Based upon the table of contents information from the CD, the memory in the player knows, for example, where each track begins, each track ends and the length of the respective track. Typically, the table of contents has the track locations. Each track has a beginning index point and may have an ending index point. Typically, the track will begin at index 1 and end at index 0. Thus, the begin play point is at track 1, index 1. If there are X tracks on a CD, the last play location would be track X, index 0. The location identified by track 1, index I is the begin play point.

Heretofore, the pre-gap provided a location point for aligning the CD in the player. The CD players are preprogrammed to locate the end of the pre-gap location, i.e. the predefined begin play location. Thereafter, the table of contents is read by the player and the player has been discovered to be programmed to remember the locations of each of the tracks on the CD. It is advantageous to use the pre-gap as an auxiliary recording zone. Thus, a conventional CD could be divided into two (2) recording zones, the pre-gap zone and the normal zone.

Using the pre-gap zone provides a new realm of functionality to the standard CD player market. No changes or adjustments need to be made to the CD player whatsoever. Typically, a CD player can access the pre-gap by pressing and holding the rewind button so that the player scrolls to the beginning of a pre-track. The length of the pre-track can be set during the time the CD's are manufactured. For example, in a conventional CD, to use the method of the present invention, termed the Justice Soundboard™ pre-track, the CD is inserted and the play button is pressed. After the play button engages the CD and the CD is aligned, the table of contents is read and the first track is presented for processing, the rewind button is pressed and held providing that the player scrolls to the beginning of the Justice Soundboard™ pre-track. When the front of the pre-track location is reached, the button can be released, and the pre-track zone data will be transcribed by the player. This provides the availability of multiple independent track recording on a conventional CD.

Figure 2:
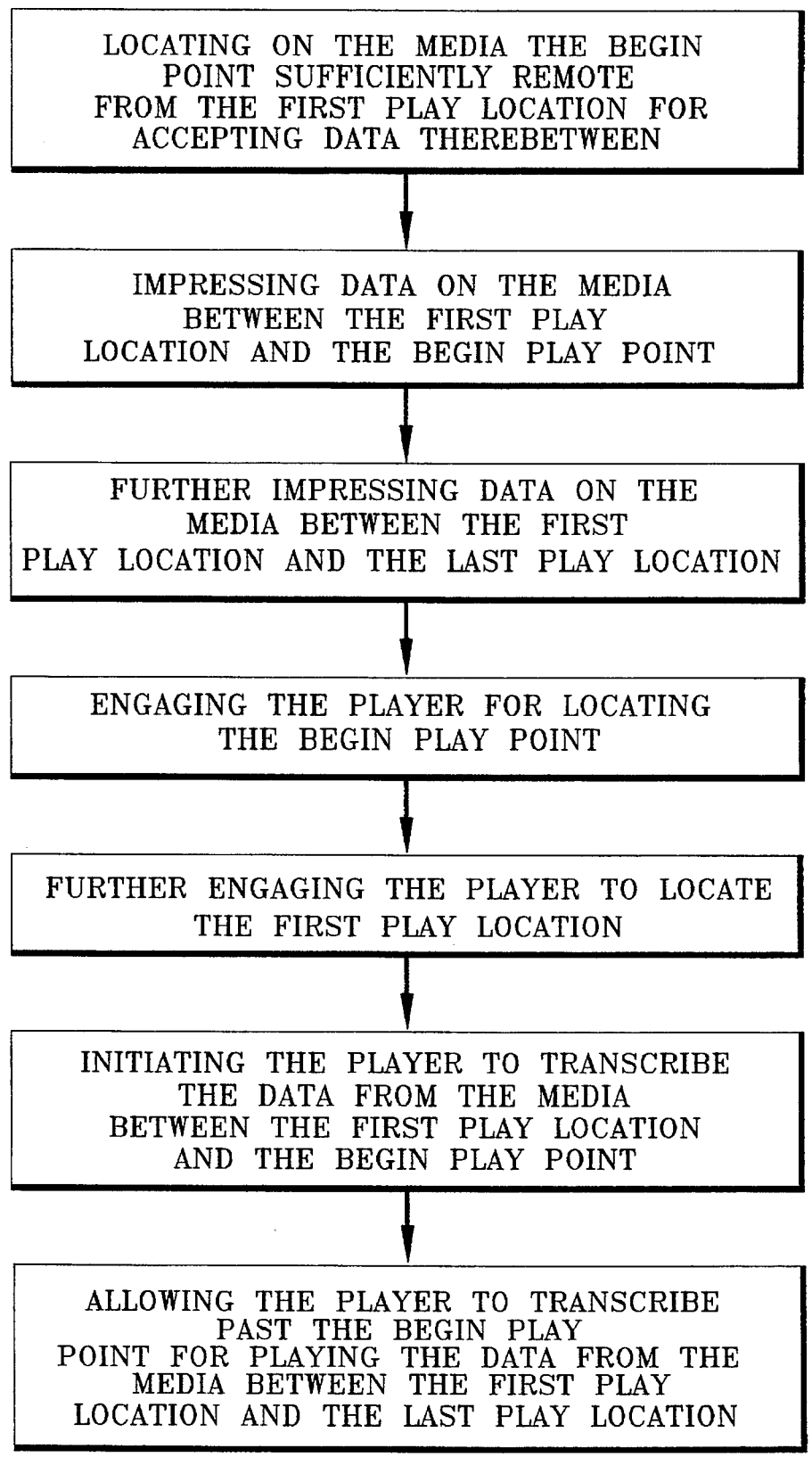
FIG. 2 is a flow diagram illustrating a preferred embodiment of the present invention.

FIG. 2 is a flow diagram illustrating the method of the present invention. The method provides for locating the begin play point on the medium sufficiently remote from the first play location for accepting data between the begin play point and the first play location. Data is impressed on the medium in the pretrack location, i.e., between the first play location and the begin play point. Then, data is placed on the media as normally done, for example, between the first play location and the last play location. Further, the method provides for engaging the player for locating the begin play point. The player can be further engaged to locate the first play location. Thereafter, the player is directed to transcribe the data from the media between the first play location and the begin play point, i.e., from the pre-gap zone. Thereafter, the player is provided access to transcribe the remaining data as normally would be transcribed from a CD by a player.

Figure 4:
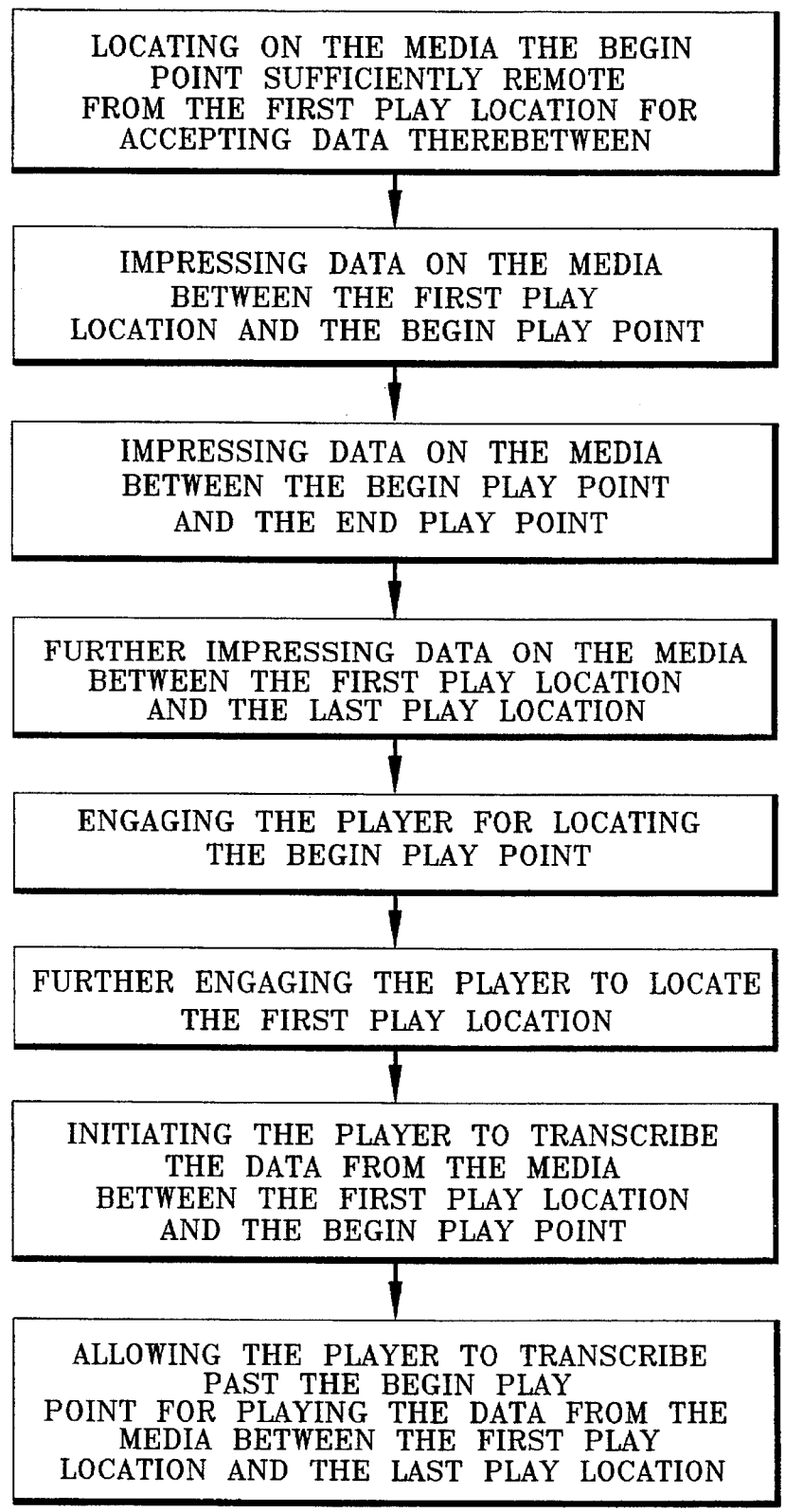
FIG. 4 is a flow diagram of another embodiment of the method of the present invention.
Figure 14:
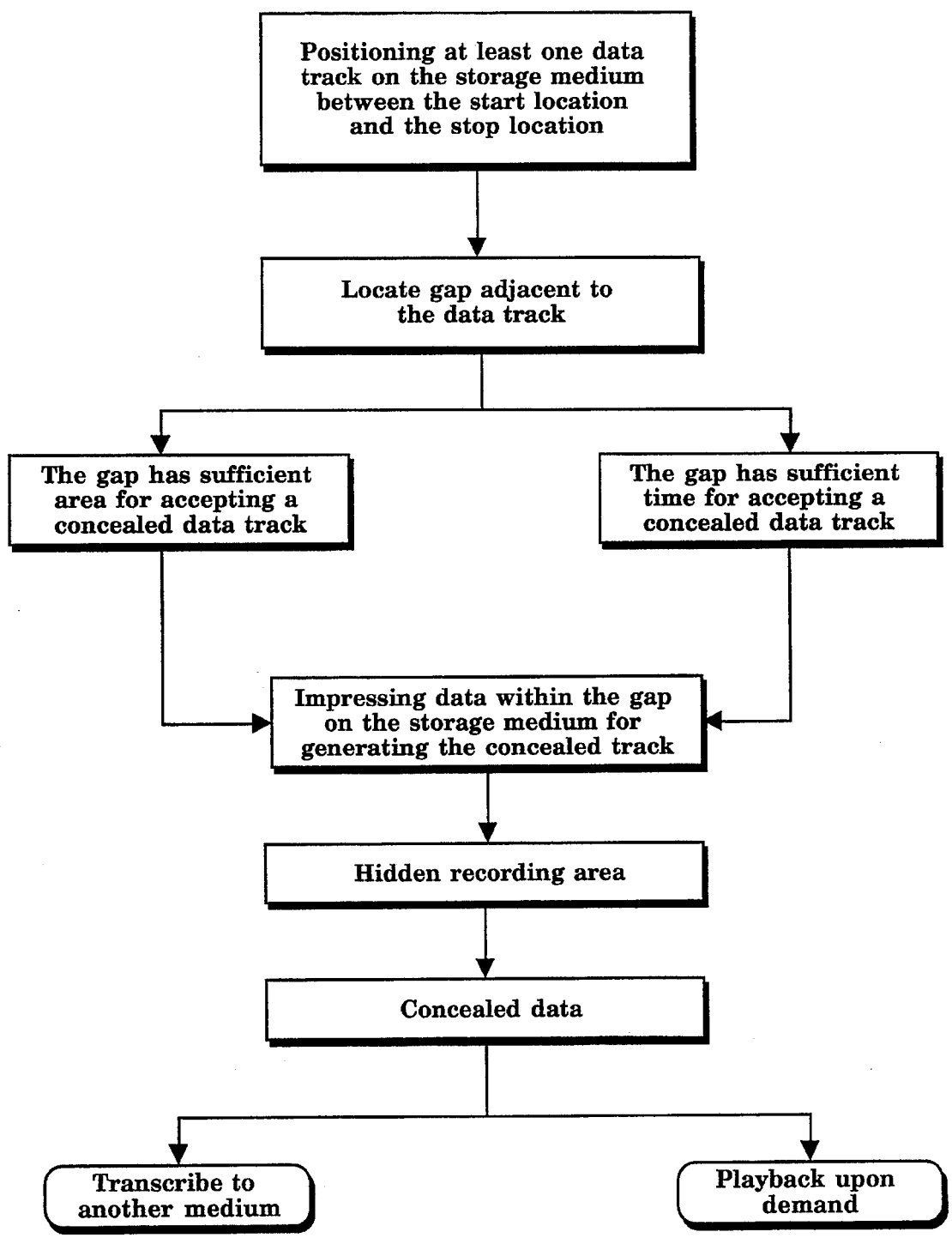
FIG. 14 is a flow chart illustrating one embodiment of the method of masking data on a storage medium as taught by the present invention.
Figure 15:
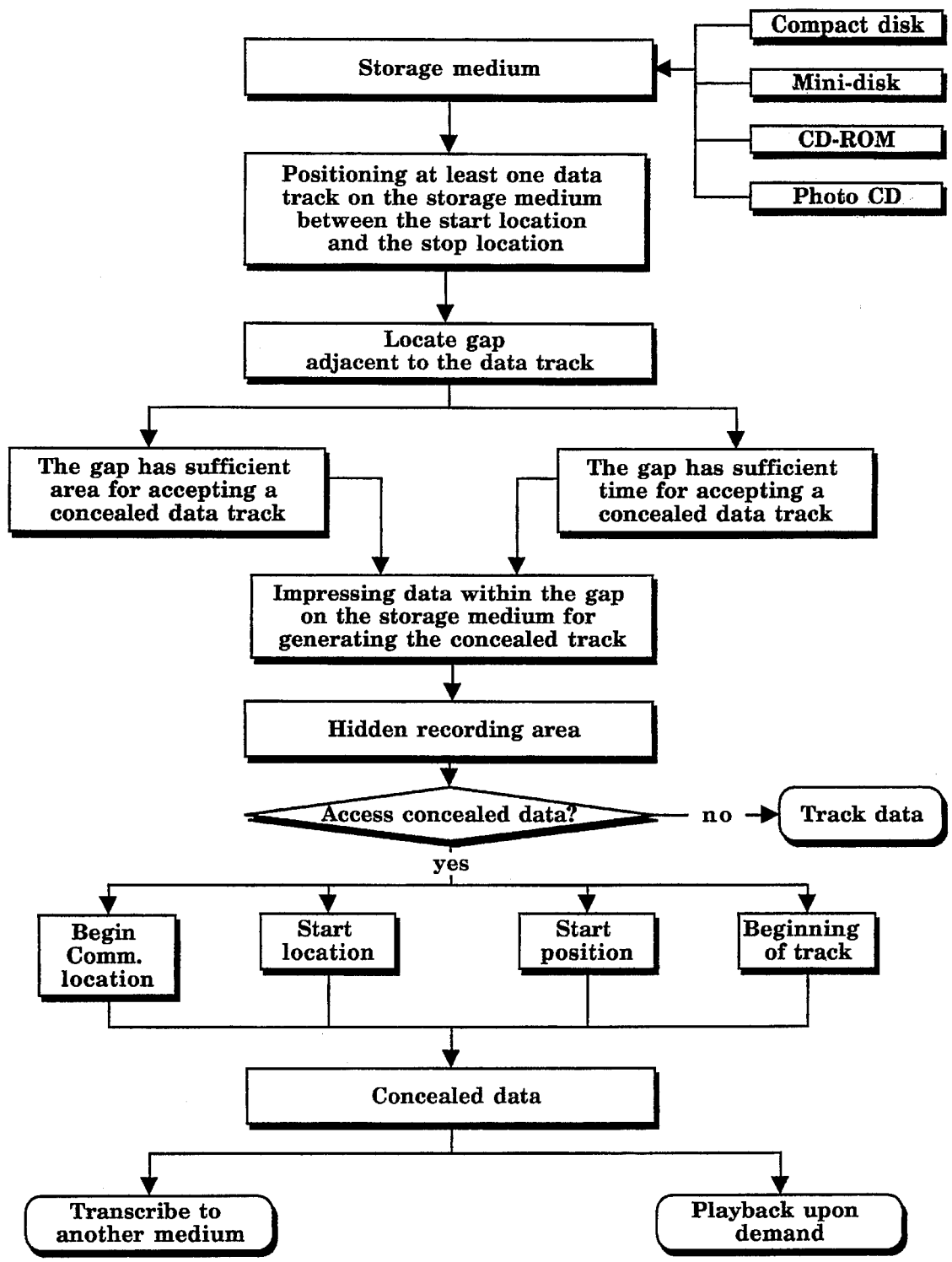
FIG. 15 is another flow chart illustrating a more detailed embodiment of the method of masking data on a storage medium as taught by the present invention.

FIG. 4 illustrates another embodiment of the invention of the present application. The method identified in the flow diagram illustrated in FIG. 4 provides for locating the begin play point on the media sufficiently remote from the first play location for accepting data in a pretrack or pre-gap zone. Data is impressed on the pretrack or pre-gap zone which is located between the first play location and the begin play point. Further, as normally done on CD media, data is impressed between the begin play point and the end play point. Typically, this is done in a series of tracks. Thereafter, the player is engaged for locating the begin play point. After the begin play point is located, the player is further engaged to locate the first play location. The player can transcribe the data from the media between the first play location and the begin play location so that the pretrack data is transcribed from the pre-gap zone. Lastly, the player can transcribe the data as normally transcribed from between the first play location and the last play location. It can be appreciated that this same technique can be used in any medium. It is not just the CD medium in which the technique can be incorporated.

FIG. 5 is a schematic illustration of a representative configuration embodying a track layout adaptable for use with the present invention. FIG. 5 illustrates a storage medium having three data tracks 202, 204, 206. The data tracks 202, 204, 206 are preceded by a start location 102, and terminated by a stop location 106. Between the data tracks 202, 204, 206 and the start location 102 and the stop location 106 are gaps G. More particularly, the gaps G may be defined as a pre-gap $G_P$, a first mid-gap $G_1$, a second mid-gap $G_2$ and an end gap $G_E$. A begin communication location 302 is typically provided for the first data track 202. Further, a begin communication location 302, 304, 306 may be provided for each respective data track 202, 204, 206. It can be appreciated by those skilled in the art that the begin communication location 302 may be the only such location required. For example, the begin communication location 302 is typically adapted for use with a player or a transcriber so that the player or transcriber will know where to begin removing data from the storage medium. Each data track 202, 204 206 has its respective recording area 212, 214, 216. Similarly, each recording area 212, 214, 216 has its respective start position 222, 224, 226.

FIG. 6 is a generic illustration of the representative configuration as illustrated in FIG. 5. FIG. 6 illustrates that a plurality of tracks can be adapted for use with the storage medium and in conjunction with the present invention. FIG. 6 illustrates data tracks ranging from data track 1 through data track N. The data tracks provide for a following gap $G_1$ through $G_X$ and $G_E$. Of particular interest is the break away portion of FIG. 6 which illustrates that the data track 204 is spaced in time or distance from the subsequent illustrated data track 21X. The data track 21X is positioned so as to be separated from data track 21X+1 by the gap $G_X$. The data track 21X+1 is spaced remotely from the last data track 21N. The last data track 21N is illustrated being adjacent the end gap $G_E$. The end gap $G_E$ separates the data track 21N from the stop location 106.

It can be appreciated by those skilled in the art that the representative configurations adapted for use with the present invention can vary. FIGS. 7, 8 and 9 illustrate variations of representative configurations which can be adapted for use with the present invention. FIG. 8 illustrates an embodiment of a representative configuration wherein the track and recording areas are identical areas 232, 234, 236. The start position 222, 224, 226 for the respective track/recording areas 232, 234, 236 are used in a similar fashion as previously discussed. It can be appreciated that the tracks illustrated may include concealed tracks pursuant to the present invention. Also, the pre-gap $G_P$, mid-gaps $G_1$, $G_2$ and end-gap $G_E$ are provided as discussed in FIGS. 5 and 6.

FIGS. 7 and 9 illustrate another representative configuration of another track layout adaptable for use with the present invention. The configurations of FIGS. 7 and 9 illustrate tracks without gaps. It can be appreciated that the tracks illustrated may include concealed tracks pursuant to the present invention. Particularly, FIG. 7 illustrates the track 202 abutting the track 204. Also, the track 204 is illustrated abutting the track 206. The recording areas 212, 214, 216 are provided with respective start positions 222, 224, 226, as previously discussed. The pre-gap and post-gap of the representative configurations can exist or not exist as the case may be. For example, FIGS. 5, 7, 8, 9 illustrate a pre-gap $G_P$ existing and not existing, similarly FIGS. 5, 7, 8, 9 illustrate the end-gap $G_E$ existing and not existing. The pre-gaps $G_P$ are identified by labels 102 and 104. The end-gaps $G_E$ are identified by numerals 106 and 108.

FIG. 10 is a schematic illustrating more particularly a concealed track disposed within a gap $G_1$ as practiced by the present invention. FIG. 10 illustrates a data track 202 and a data track 204 having a gap $G_1$ there between. The data track 202 has a recording area 212 and a start position 222. The data tracks 202, 204 are preceded by a start location 102. The first data track 202 has a begin communication location 302 aligned in the general vicinity of the start position 222. The data track 204 has a recording area 214 and a start position 224. Between the data tracks 202, 204, is the concealed track C202. The concealed track C202 comprises a recording area C212 and a start position C222. The gap $G_1$ between the data tracks 202, 204 includes the entirety of the concealed track C202 and its adjacent gaps $G_{C1}$, $G_{C2}$. It can be appreciated by those skilled in the art that the gaps $G_{C1}$, $G_{C2}$ associated with the concealed track C202 can be of whatever dimensions are desired with respect to time or location. Also, it can be appreciated by those skilled in the art that the gaps can be displaced or omitted altogether such that the data track 202 abuts against the concealed track C202, and the concealed track C202 abuts against the other data track 204, thus, providing an embodiment without any gaps.

FIG. 11 illustrates yet another embodiment of the present invention with the concealed track C202 at the end of the data medium. FIG. 11 illustrates a plurality of data tracks 201-20N as illustrated with a break away. The break away provides that any number of data tracks can be disposed between the illustrated data tracks 202, 20N. The concealed track C202 having a recording area C212 and a start position C222 is disposed between the last data track 20N and the stop location 106. The gap $G_E$ between the last data track 20N and the stop location 106 provides for the full dimension of the concealed track C202 and its respective gaps $G_{C1}$, $G_{CE}$. As previously discussed, the respective gaps $G_{C1}$, $G_{CE}$ can be altered in size or eliminated completely.

FIG. 12 illustrates yet another embodiment of the present invention wherein two concealed tracks C202, C204 are placed between two data tracks 202, 204. The concealed tracks C202, C204 are, for example, placed near the beginning of the storage medium so as to be between the first two data tracks 202, 204. The concealed tracks C202, C204 and their associated gaps $G_{C1}$, $G_{C2}$, $G_{C3}$ fill the entire gap $G_1$ between the first data track 202 and the second data track 204. Each concealed data track C202, C204 has its recording area C212, C214 and start position C222, C224, respectively.

FIG. 13 illustrates yet another embodiment of the present invention wherein a plurality of concealed tracks C202, C204 are located at the end of a storage medium. FIG. 13 illustrates two of the plurality of concealed tracks C20N-1, C20N disposed between the last data track 20N and the stop location 106. The concealed data tracks C20N-1, C20N are disposed in the end gap $G_E$. The entire dimension of the end gap $G_E$ includes the first concealed gap $G_{C1}$, the concealed track C20N-1, the second concealed gap $G_{C2}$, the concealed track C20N and the gap $G_{CE}$. In its schematic representation, the embodiment of the invention illustrated in FIG. 13 expands the entire length of the storage medium from the start location 102 to the stop location 106. It can be appreciated that numerous concealed tracks can be placed in each respective gap between data tracks. Also, it can be appreciated that numerous concealed tracks can be placed in the pre-gap just as easily as has been illustrated in the mid-gaps and the end-gap.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A method of masking data on a magneto-optical medium for selective playback upon demand or for transcription to another medium, the magneto-optical medium adapted for communication with a player or transcriber such that the magneto-optical medium has a start location and a stop location with at least one data track therebetween, each data track including a data recording area for executing at least one of recording and reproducing the data, and each track including a start position indicative of a beginning location for the data recording area for that track, the start location precedes the first start position for the first track for at least one of location or time, and the stop location follows the last data recording area for the last track for at least one of location or time, the magneto-optical medium has a begin communication location at or in close proximity to the start position indicating the beginning of the data recording area for the respective track, the first start position is indicative of the beginning of the data recording area for a first track and the start position for each subsequent track, if any, is indicative of the beginning of the data recording area for the respective track, such that the magneto-optical medium is engaged at the begin communication location for executing at least one of recording and reproducing data for each respective data track, the method comprising the steps of:

(a) after the first data track, determining the position of the start location on the magneto-optical medium, (b) determining the position of the stop location on the magneto-optical medium, (c) positioning at least one data track on the magneto-optical medium between the start location and the stop location such that the data track has, adjacent thereto, at least one of sufficient location or time for accepting a concealed data track, which sufficient location or time is defined as a gap, (d) impressing data on the magneto-optical medium and within the gap for generating the concealed track having a hidden recording area such that the hidden recording area is located after the first data track and contains concealed data which can be accessed upon demand for transcription to another medium or for playback.

2. The method of masking data on a magneto-optical medium for selective playback upon demand or for transcription to another medium as defined in claim i further comprising the step of using a compact disk as the magneto-optical medium.

3. The method of masking data on a magneto-optical medium for selective playback upon demand or for transcription to another medium as defined in claim 2 wherein the step of using a compact disk as the magneto-optical medium comprises using a read-only memory compact disk.

4. The method of masking data on a magneto-optical medium for selective playback upon demand or for transcription to another medium as defined in claim 1 further comprising the step of using a mini-disk as the magneto-optical medium.

5. The method of masking data on a magneto-optical medium for selective playback upon demand or for transcription to another medium as defined in claim 1 further comprising the step of using a photo compact disk as the magneto-optical medium.

6. The method of masking data on a magneto-optical medium for selective playback upon demand or for transcription to another medium as defined in claim 1 wherein the step of impressing data on the storage medium for generating the concealed data track further comprises the step of generating the concealed data track comprising the steps of:

(a) identifying a position within the gap relative to at least one of location or time for operative association with a player/transcriber, (b) impressing the concealed data track on the storage medium at the identified position comprising the steps of:

(1) impressing a recording area within the concealed data track, and (2) impressing a start position within the concealed data track for indicating the location where the recording area beans for the concealed track.

7. The method of masking data on a magneto-optical medium for selective playback upon demand or for transcription to another medium as defined in claim 6 wherein the step of identifying a position within the gap comprises the step of identifying a position with respect to the begin communication location.

8. The method of masking data on a magneto-optical medium for selective playback upon demand or for transcription to another medium as defined in claim 6 wherein the step of identifying a position within the gap comprises the step of identifying a position with respect to the start location.

9. The method of masking data on a magneto-optical medium for selective playback upon demand or for transcription to another medium as defined in claim 6 wherein the step of identifying a position within the gap comprises the step of identifying a position with respect to the start position.

\* \* \* \* \*